Oct. 17, 1972   M. SKOBEL   3,698,988
EQUIPMENT FOR MAKING REINFORCED TUBING
Filed June 10, 1971   4 Sheets-Sheet 1
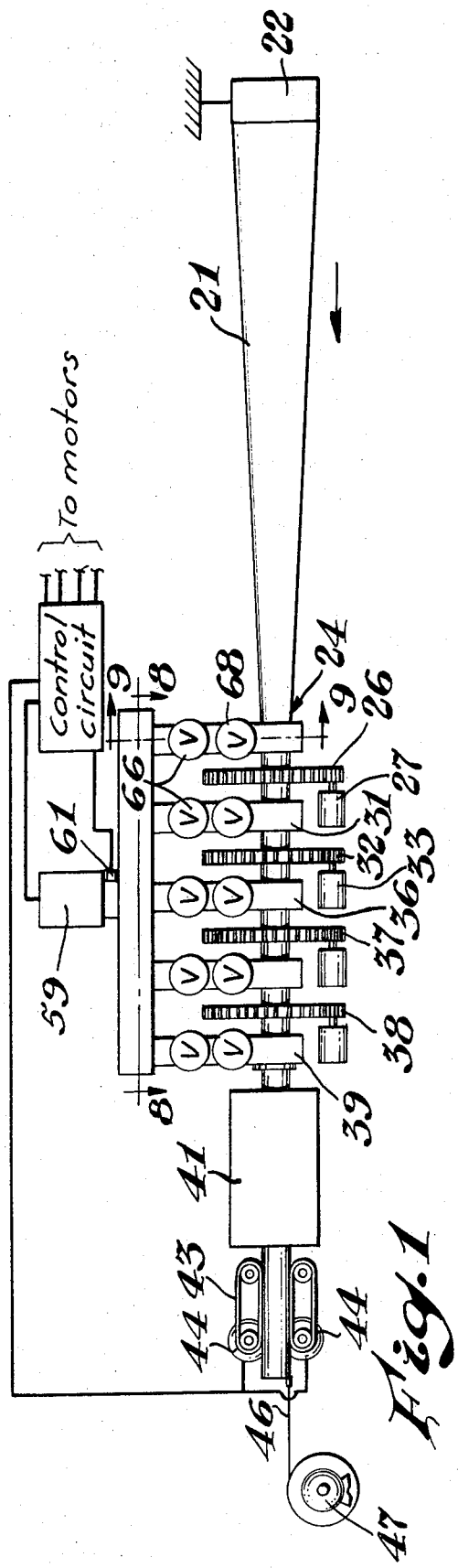
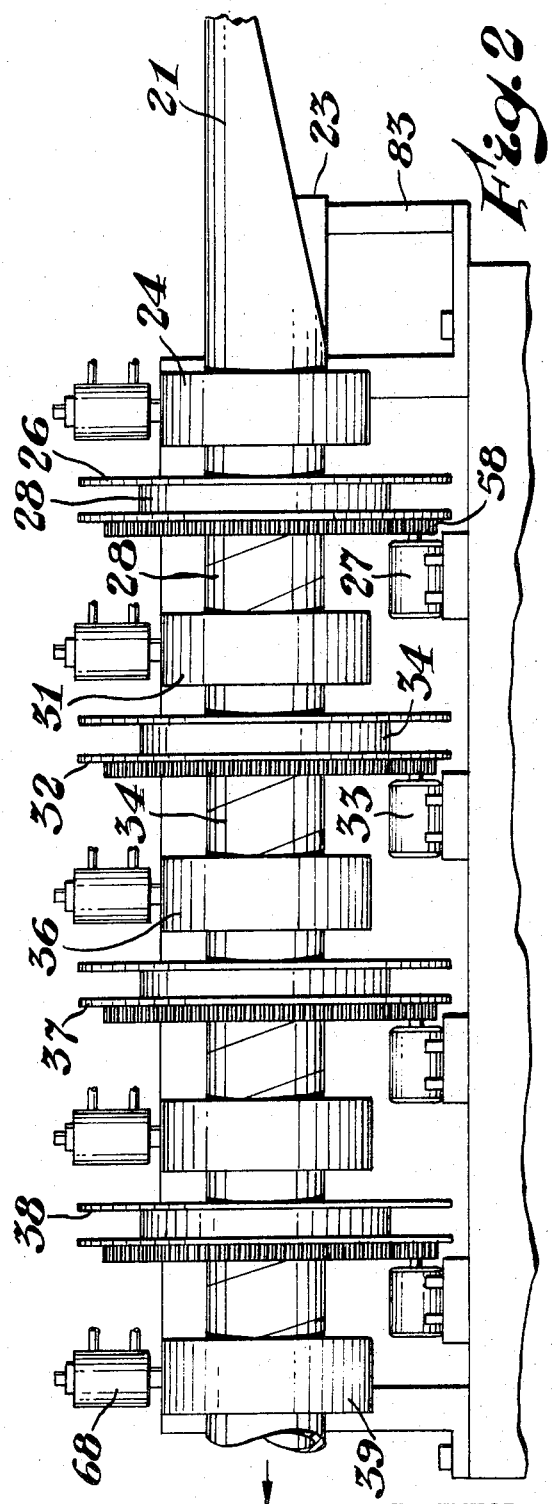
INVENTOR.
Max Skobel
BY
Howard W. Hermann
ATTORNEY Oct. 17, 1972　　　　　M. SKOBEL　　　　　3,698,988
EQUIPMENT FOR MAKING REINFORCED TUBING
Filed June 10, 1971　　　　　　　　　　　　4 Sheets-Sheet 2
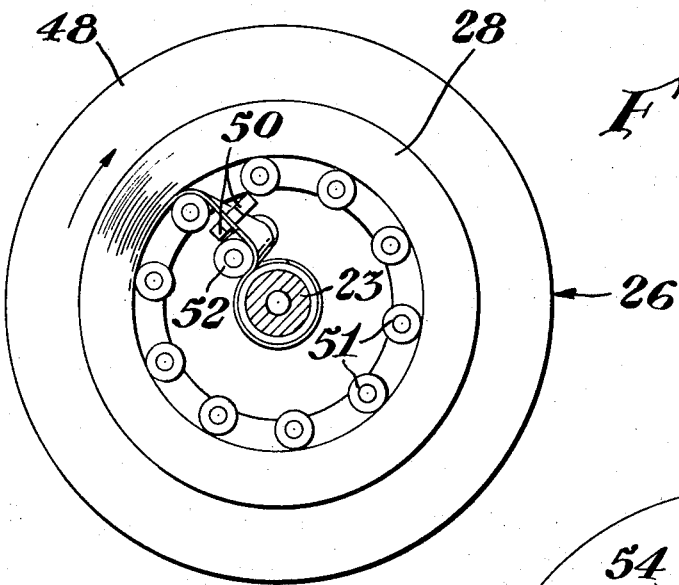
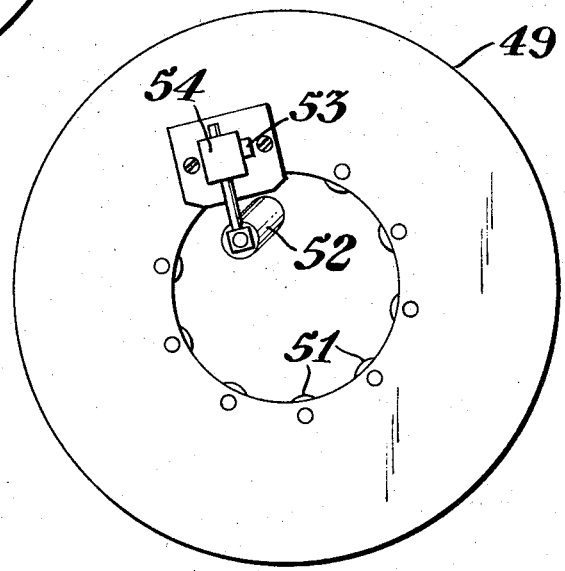
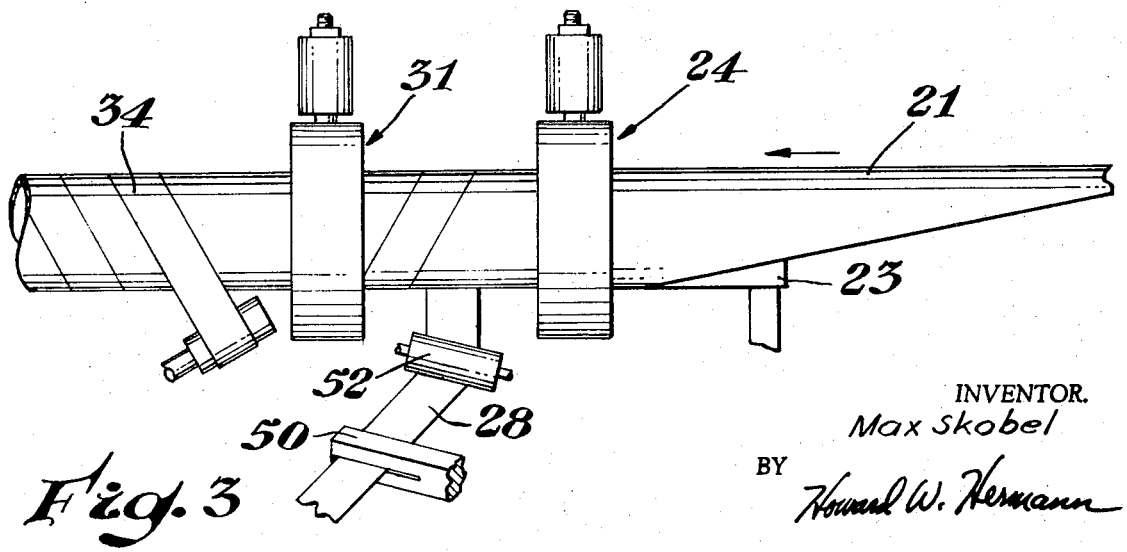
INVENTOR.
Max Skobel
BY
Howard W. Hermann
ATTORNEY

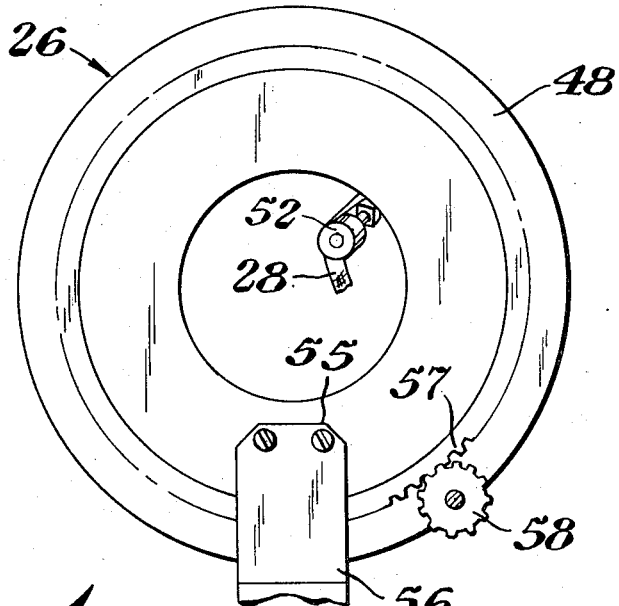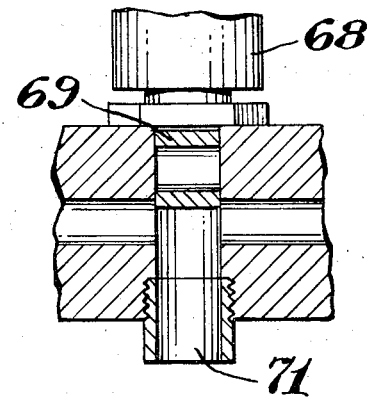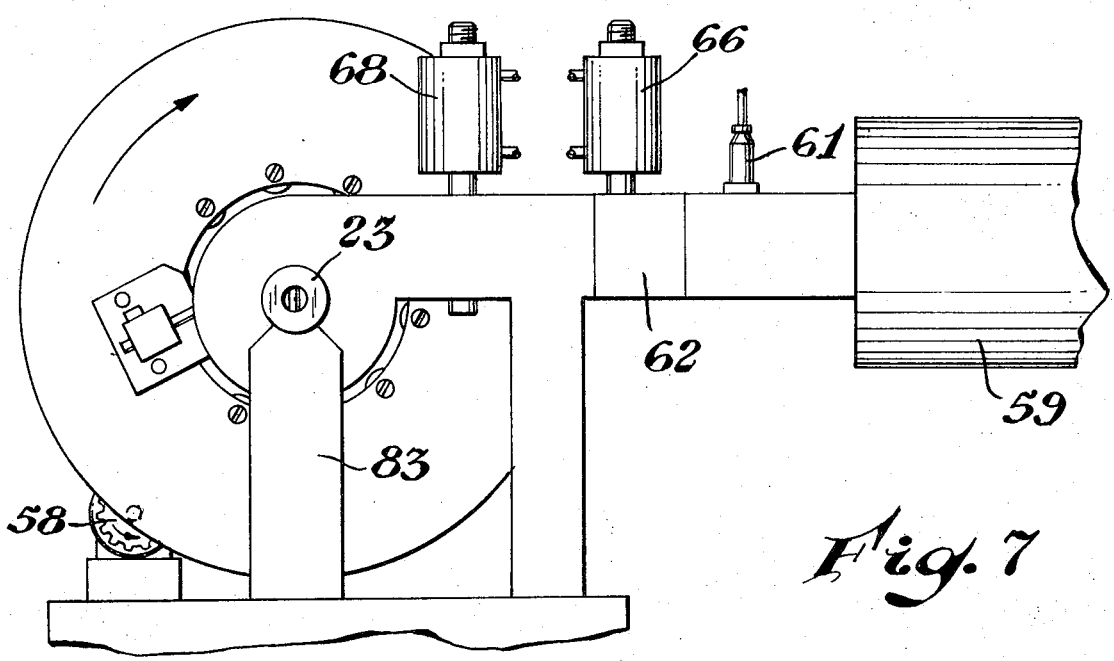

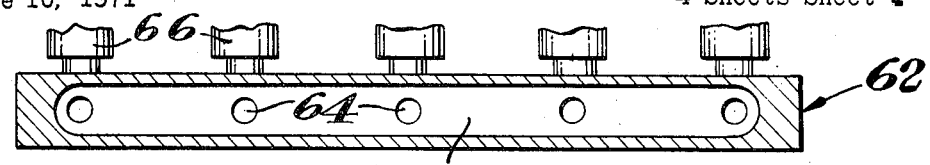
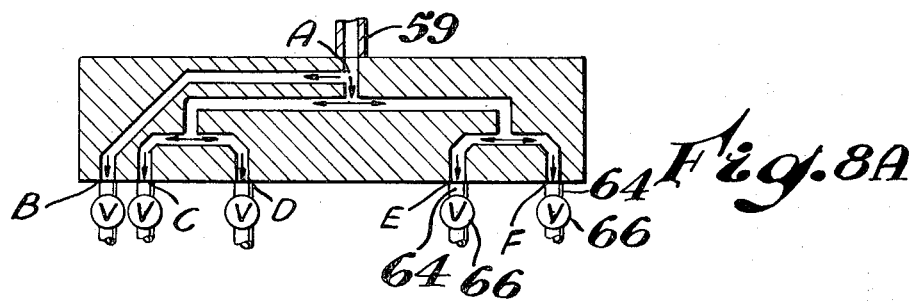
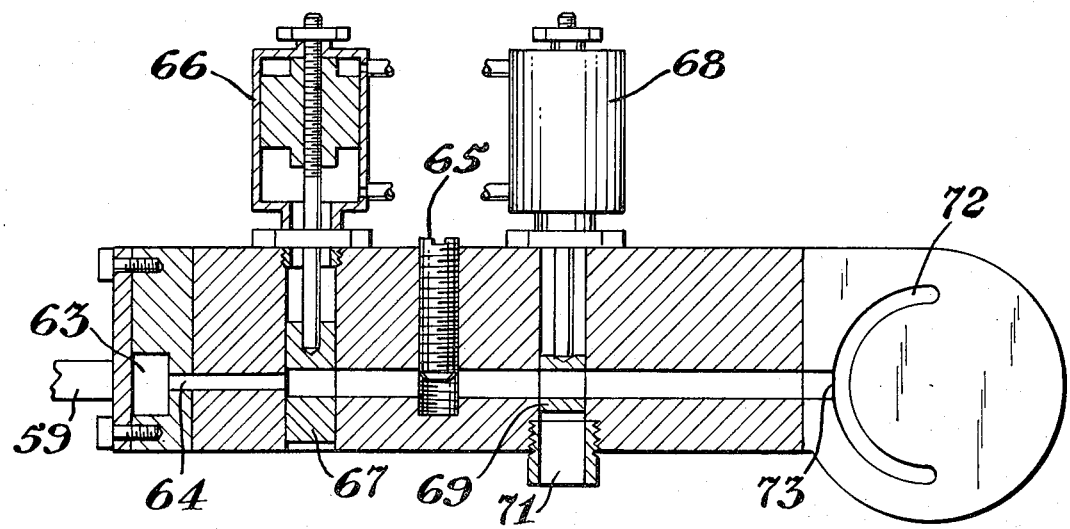
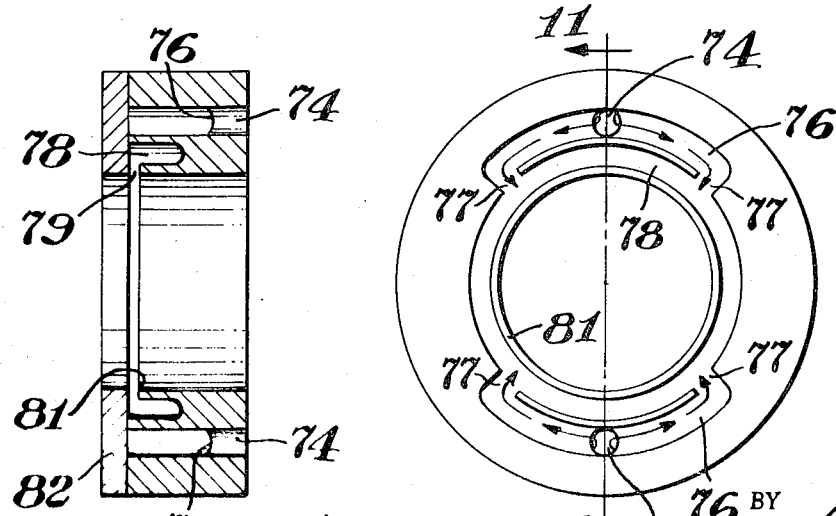

_United States Patent Office_  3,698,988
Patented Oct. 17, 1972

3,698,988
EQUIPMENT FOR MAKING REINFORCED TUBING
Max Skobel, Edison, N.J., assignor to Dow Corning
Corporation, Midland, Mich.
Filed June 10, 1971, Ser. No. 151,679
Int. Cl. B29d 23/12
U.S. Cl. 156—428                                 11 Claims

ABSTRACT OF THE DISCLOSURE

Equipment for making tubing of extruded rubber or plastic reinforced with fabric webs, on a continuous basis. A sacrifice web is transversely bowed around and pulled over a stationary cylindrical mandrel and alternate extruded layers and helical wrappings of reinforcement material are laid down on the sacrifice web which can be removed from the tubing after it is completed and cut to length.

BACKGROUND OF THE INVENTION

This application relates to the manufacture of reinforced tubing by a continuous extrusion process.

Numerous methods exist for the production of reinforced tubing from natural or synthetic rubbers and plastic materials. Reinforcement of such materials is generally accomplished by filaments, or by braids, knits, or weaves of filamentary materials such as polyesters, cottons, nylon, or glass fibers, for example. The filaments add strength to the basic material to allow it to better withstand internal pressures and provide a desired degree of rigidity to allow bending without kinking. Particularly in the manufacture of reinforced synthetic tubing such as high pressure hoses of silicone rubber there is at present no good method of making such articles on a continuous basis. Substantial labor is involved in what is essentially a multiple step operation and wall thickness is difficult to control.

SUMMARY OF THE PRESENT INVENTION

Accordingly, it is an object of the present invention to provide continuous apparatus for making reinforced rubber or plastic tubing with precisely controlled wall thickness.

A further object is to provide such apparatus in which the amount of reinforcement can be varied without the necessity of using other equipment.

In accordance with these and other objects there is provided by the present invention apparatus which builds up alternate extruded and reinforcement web layers on a sacrifice web which is transversely bowed around and pulled along a cylindrical mandrel. First a layer of uncured material is extruded on the sacrifice web. Then a helical layer of reinforcing material is wrapped on the extrusion. Then another extrusion is laid down, and so forth in alternating fashion until the desired number of layers have been applied to the sacrifice web. The composite formed has uniform walls guaranteed by equal pressure distributions around the extrusion die and by control features in the equipment to eliminate thin and thick spots resulting from temporary shutdown and startup. Once the tubing has been cut to length and cured the sacrifice web is simply pulled from the center of the tube segment before use.

BRIEF DESCRIPTION OF DRAWINGS

The invention will become better understood by reference to the following detailed description of specific embodiments thereof when read in connection with the accompanying drawings wherein:

FIG. 1 is a diagrammatic top view of an embodiment of the invention;

FIG. 2 is a side elevation of the extrusion die portion of the embodiment of FIG. 1;

FIG. 3 is a side elevation view of a fragment of the portion shown in FIG. 2 with the reinforcement web reels removed;

FIG. 4 is a side view of one of the reinforcement web reels of FIGS. 1–3 with one reel flange removed to show inner detail;

FIG. 5 is a side elevation view of the exterior of one of the reinforcement web reels of FIGS. 1–4;

FIG. 6 is a side elevation view of the opposite side of one of the reinforcement web reels from that shown in FIG. 5, including mounting and drive elements;

FIG. 7 is an end view of the embodiment shown in FIGS. 1 and 2;

FIG. 8 is a cross-sectional view of the manifold taken in the line 8—8 of FIG. 1;

FIG. 8(a) is a horizontal cross-sectional view taken through a manifold embodiment alternative to that shown in FIG. 8;

FIG. 9 is a vertical cross-sectional view taken along the line 9—9 of FIG. 1 through one of the extrusion die feed channels;

FIG. 9(a) is a fragmentary vertical cross-sectional view of the dump valve portion of FIG. 9 showing that valve in its dump position;

FIG. 10 is an elevational view of one of the die distribution plates of the embodiment of FIGS. 1–9; and FIG. 11 is a vertical cross-sectional view taken through one of the extrusion dies and die distribution plates of FIGS. 1–10.

DESCRIPTION OF PREFERRED EMBODIMENTS

Referring now to the drawings wherein like reference characters designate like or corresponding parts throughout the figures thereof there are shown in FIGS. 1–3 a general layout of equipment for continuously making reinforced rubber hose by an extrusion process.

FIG. 1 is a partially schematic top view in which a sacrifice carrier web 21 fed from a web supply roll 22 is transversely bowed into a closed cylindrical shape with abutting edges around a generally cylindrical mandrel 23 (FIGS. 2 and 3) by a conical ring which forms the entrance to a first extrusion die shown generally as 24. In general the sacrifice web 21 must be of a material which is easily released or stripped from the rubber or plastic material being extruded from the extrusion die 24 after the rubber is cured. It must also be of a material which exhibits low friction in contact with the mandrel 23. Preferably the mandrel is made of aluminum covered with a sleeve of polytetrafluoroethylene and the sacrifice web is a polyester film such as Mylar®, or may be polyvinylchloride or polyethylene, for example, although it is to be understood that other materials may be used both in forming the mandrel and in manufacturing the sacrifice web. It is also desirable that the mandrel have a slight taper in the direction of web movement to counter any tendency of sticking of the web 21 to the mandrel due to pressures exerted on the external surface of the web as extrusion and wrapping occur. Since the web is generally pulled from the internal surface of the finished tubing it should be easily releasable therefrom.

From the first extruder die 24 a layer of rubber or plastic is extruded on the surface of the cylindrically shaped sacrifice web 21. Immediately adjacent the output side of the extruder is a first reinforcing web supply reel 26 driven by a motor 27 or other suitable means for rotating the reel. A first reinforcement web 28 (FIGS. 2 and 3) is wrapped around the extruded layer on the sacrifice web 21 from the supply reel 26 as the reel is rotated by means of a suitable power source such as first reel drive motor 29. The reinforcement web 28 imbeds itself in the extruded material as it is wrapped.

The tubular sacrifice web 21 with its layer of extruded material and its layer of reinforcing web 28 then passes through a second extrusion die shown generally at 31 where another layer of rubber or plastic material is extruded onto the surface of the composite tube as it passes through the die. The pressure in the die is sufficient to completely imbed the first reinforcing web 28 in the extruded material and the die diameter is sufficiently large to provide an overcoat on the layer of reinforcing material.

The composite tube now passes through a second reinforcing web supply reel 32 preferably rotated in a direction opposite the direction of rotation of the first reinforcing web supply reel 26 by suitable means such as a motor 33. A second reinforcing web 34 (FIGS. 2 and 3) supplied by the reel 32 is thereby wrapped around the composite tube of sacrifice web coated by the two previous extrusions having the first reinforcing web 28 imbedded therein. Due to the axial motion of the composite tube as the reel 32 is rotated the web is applied in helical fashion to the composite tube and due to the opposite direction of rotation of the reel 32 from that of the reel 26 the second web 34 forms an angle with respect to the first web 28 thereby eliminating any weak spots in the composite tube due to direct overlaying of the second web on the first as would be possible if the spirals formed by both webs had the same direction.

The composite tube, now having the second reinforcement web 34 forming the outermost layer thereof, passes into a third extrusion die shown generally at 36 wherein more material is extruded, filling the interstices in the reinforcing web 34 and providing yet another layer on the composite over the periphery thereof. Depending upon the desired strength of the tube being produced the composite can after the third extrusion pass to a curing oven for curing the composite, or further layers similar to those described above can be applied. As shown in the drawings the composite tube passes through two more stages of reinforcement and extrusion. The third reinforcements web supply reel 37 preferably rotates in a direction opposite the second web supply reel 32 and the fourth web supply reel 38 rotates in the direction opposite the third. Similarly, additional stages of alternating reinforcement and extrusion can be added as desired.

The finished tubing then passes out of the last extrusion die and into a curing oven 41. Because the extruded material prior to curing is generally weak and likely to sag the curing oven must be positioned close to the output side of the last extrusion die 39. Alternatively support for the tubing, in the form of concave rollers, for example, is required. If desired, the tubing can be cut into desired lengths and preshaped prior to curing. If the tubing is to be bent prior to curing a stretchable reinforcement fabric is preferred to prevent distortion of the cylindrical shape of the tube.

In order to pull the composite through the oven and lay-up system a capstan 43 driven by a motor 44 is provided. However, for start-up purposes a pulling tape 46 of metal, for example, is clamped to the sacrifice web 21 after it has been manually fed onto the mandrel 23 and the tape is wound on a powered reel 47 to pull the tubing through the system until it can be engaged by the capstan 43.

The reinforcement web wrapping system may be seen more clearly in FIGS. 4–6 which shows for example reinforcement web supply reel 26. The reel comprises a pair of parallel flanges 48, 49 spaced from one another and secured together by a plurality of rollers 51 spaced around the inner periphery thereof. The reinforcement web fits loosely between the two flanges in coiled form with its innermost end threaded between a pair of the rollers 51 toward the axis of the reel. Mounted on the flange 49 are a pair of pressure pads 50 and an adjustable guide roller 52 which is adjustably pivotable relative to the reel axis and adjustably spaced from the axis by suitable means such as a set-screw 53 which when loosened allows the mounting shaft of the roller 52 to be slid in or out and/or rotated in the mounting block 54 secured to the reel flange 49.

The reel is mounted for rotation by means of a bearing ring 55 secured to a pedestal 56 which extends from the equipment base. A gear ring 57 is secured to the flange 48 concentrically therewith and co-acts with a drive gear 58 driven by the reel drive motor 27 (FIG. 1). As the reel rotates the reinforcement web 28 is unwound at its inner periphery and pulled out between the rollers 51 thereby wrapping around the composite tube supported by the mandrel 23 which is positioned concentrically on the reel axis as the composite tube slides axially along the mandrel. The guide roller 52 serves to lay the reinforcement web 28 on the composite tube in an even manner to compensate for the axial movement of the composite.

Referring now to FIGS. 1, 7, 8 and 9, the extrusion die feed system first comprises an extruder 59, which may be of any conventional design having control of the pressure applied to the material therein. A conventional pressure sensor 61 is applied at the extruder head to sense pressure being applied at that point and provide an electrical or other signal for control of the extruder. The extruder feeds into a manifold 62 which comprises an elongated chamber 63 (FIG. 8) having an outlet 64 corresponding to each extruder head. In order to provide for substantially equal pressure in each of the manifold outlets 64 the cross-sectional area of each of the outlets should be small in comparison with the cross-sectional area of the manifold chamber 63.

In order to ensure equal pressures in all extrusion paths it is desirable to provide equal path lengths in all paths from the extruder. A suitable alternative manifold 62' for accomplishing this purpose is shown in FIG. 8(a). The entire extruder output arrives at point A where it begins dividing into a plurality of channels to feed each of the extruder dies. The distance from point A to each of points B, C, D, E, and F should be of equal length and cross-sectional area. The pressures in the channels at each of the start-stop valves 66 will then necessarily also be equal.

The outlet 64 of each of the die channels leads to a start-stop valve 66 which is preferably a pneumatic cylinder actuated valve comprising an apertured piston 67 (FIG. 9) which moves vertically to open or close the manifold outlet 64. When the valve 66 is open the material in each channel passes on through a vernier adjusting flow control screw 65 to a dump valve 68, also preferably of the pneumatic type, which moves an apertured piston 69 from a pass-through position as shown in FIG. 9 to a "dump" position as shown in FIG. 9(a). In the pass-through position material passes through the valve and the valve has no effect. In the dump position, however, the material path is opened to an aperture 71 to allow spilling or dumping of the material as will hereinafter be more specifically described.

As an alternative to the manual vernier adjustment flow control screw 65, automatic variable control can be accomplished by use of a reversible motor for driving the screw 65 in accordance with pressure variations read by means of a second pressure sensing element similar to element 61 but preferably positioned in each channel between the dump valve 68 and the die head.

From the dump valve 68 when the valve is in passthrough position the material continues to pass to a first die distribution channel 72 which is semicircular in shape, terminating at points equidistant from the point of entry 73 of the material into that channel. In FIGS. 10 and 11 there are shown two views of the extruder die plate which is placed over the first die distribution channel 72. The inlet holes 74 which pass through the die distribution plate correspond to the termination points of both ends of the first die distribution channel 72 (FIG. 9). As may be seen in FIGS. 10 and 11 each of the holes 74 feeds one of a pair of second die distribution channels 76 which are arcuate, extending equal distances to both sides of the inlet holes 74 in the plate, the four terminal points being 90° apart around the plate and equidistant from the axis thereof. Four radial distribution channels 77 now feed radially inwardly to a circular inner die distribution channel 78. In forming tubing of diameter greater than about four inches in diameter, it is desirable to insert another die distribution plate further subdividing the four channels into eight equally spaced channels before reaching the circular inner die distribution channel 78. Additional plates can be added for still larger diameters.

The die opening 79 (FIG. 11) is formed between an inner peripheral ring 81 and a flat backing plate 82 and allows material to extrude from that space. The inner peripheral diameter of the die backing plate 82 and the die plate is chosen to correspond to the desired thickness of the extrusion on the tubular composite passing therethrough. Therefore, while all of the dies 24, 31, 36 and 39 can be similar in design each must have a slightly larger diameter to accommodate the composite tube passing through the system.

The mandrel 23 as can be seen from FIG. 7 is mounted concentrically in the die and reel system by means of a pedestal 83 to which it is secured at its outer end. While the mandrel must be held in place axially it is in effect self-centering when the system is in operation because of the equal pressures applied from the extrusion dies. Careful design, including a sufficient number of equal path lengths of the extruded material to the die, achieves this pressure balance and provides for even coating in each die.

To operate the system, assuming the sacrifice web 21 and reinforcement webs are properly threaded in the system, first the extruder is turned on with the start valve 66 in open position and the dump valve 68 in dump position in each channel in which extrusion is desired. When the extruder pressure as read by the sensor 61 at the extruder outlet reaches approximately 90 percent of the desired operating pressure the dump valve 68 is closed. As soon as the pressure at the extruder outlet reaches the full desired operating pressure the pulling system and reinforcing web motors are actuated. The time between closing the dump valve and actuation of the pulling and winding mechanism is generally in the range between two and ten seconds and after experimentation the web start mechanisms can be accomplished by means of a timer instead of pressure actuated control for purposes of economy if desired. The time delay ensures that full extrusion pressure is being applied to the dies and that any transients caused by closing the dump valve have died out.

The web supply reel motor speeds are preferably synchronized with the pulling speed of the composite tubing in the system in a manner such that adjacent helical turns of the reinforcement web just abut one another with no overlap and no appreciable space between turns. Therefore, vernier speed control on each of the web supply reel drive motors is desirable. It is of course possible to use a single motor with gearing to drive all web reels, but in such case individual vernier speed control becomes difficult if not impossible.

In order to stop the system, the extruder is stopped first. When pressure at the extruder output drops to 90 percent of full pressure the pulling and winding motors are turned off and the dump valve opened simultaneously. The delay instead of being pressure actuated can be set by a time delay in the range of one-half to five seconds depending on materials, flow distances, die sizes and possibly other factors, but easily determined by experimentation. If too long a delay is imposed the stopped portion in the die will have a thinned layer. If too short a delay is imposed a bulge will occur. Stopping, of course, is necessary whenever web supplies must be replaced, so an automatic control system for stopping and restart is desirable.

Various other modifications and variations of the system and variations thereof disclosed specifically herein will become obvious to those skilled in the art from a consideration of the foregoing description of preferred embodiments. It is to be understood therefore that within the scope of the appended claims the invention can be practiced otherwise than as specifically described.

That which is claimed is:

1. Apparatus for continuously making reinforced tubing from extruded heat curable materials comprising,
   an extruder,
   an extrusion manifold for dividing flow from said extruder into a plurality of channels,
   a circular extrusion die fed by each of said plurality of channels,
   a cylindrical mandrel extending through all of said extrusion dies,
   means for axially feeding a sacrifice web in transversely bowed form over the surface of said mandrel with the opposite edges of said web substantially in abutting relationship, and
   reinforcement web supply reel means interposed between each adjacent pair of said extrusion dies for helically wrapping a reinforcing web around the material extruded by one of said pair of extrusion dies.

2. Apparatus as defined in claim 1 wherein each of said circular extrusion dies comprises a circular cavity which is fed from a plurality of radial points of entry into said cavity spaced equidistant from each other around the circumference of said cavity and the flow distances from said manifold to each of said points of entry are substantially equal, whereby substantially equal pressure is achieved around the die circumference.

3. Apparatus as defined in claim 2 but further including a dump valve interposed in each of said plurality of channels, said dump valve providing means for allowing flow of material from said extruder to the die associated with said channel or alternatively allowing flow of material from the extruder and from that portion of the channel between the dump valve and the die to flow out of said channel for substantially immediate pressure relief upon actuation.

4. Apparatus as defined in claim 1 but further including a dump valve interposed in each of said plurality of channels, said dump valve providing means for allowing flow of material from said extruder to the die associated with said channel or alternatively allowing flow of material from the extruder and from that portion of the channel between the dump valve and the die to flow out of said channel for substantially immediate pressure relief upon actuation.

5. Apparatus as defined in claim 4 and further including a start-stop valve means interposed in each of said channels between said manifold and said dump valve for closing or opening said channel.

6. Apparatus as defined in claim 5 further including means for adjusting the cross-sectional area of each of said channels at one portion thereof to allow adjustment of material flow through each channel relative to the other channels.

7. Apparatus as defined in claim 6 wherein each said reinforcement web-supply reel means is mounted concentrically with said mandrel.

8. Apparatus as defined in claim 7 wherein each said reel comprises
   a pair of parallel flanges spaced by a plurality of rollers mounted in a circle around the inner periphery of the flanges,
   means for rotating the flanges,
   a reinforcement web wound over said rollers, being freshly slidable between said flanges and having its inner convolution threaded inwardly between a pair of said rollers toward the axis of rotation of said flanges, and guide means adjustably affixed to at least one of said flanges for guiding the reinforcement web onto the extruded material on said sacrifice web.

9. Apparatus as defined in claim 1 wherein each reinforcement web-supply reel means is mounted concentrically with said mandrel.

10. Apparatus as defined in claim 9 wherein each said reel comprises a pair of parallel flanges spaced by a plurality of rollers mounted in a circle around the inner periphery of the flanges, means for rotating the flanges, a reinforcement web wound over said rollers, being freely slidable between said flanges and having its inner convolution threaded inwardly between a pair of said rollers toward the axis of rotation of said flanges, and guide means adjustably affixed to at least one of said flanges for guiding the reinforcement web onto the extruded material on said sacrifice web.

11. Apparatus as defined in claim 10 wherein each of said circular extrusion dies comprises a circular cavity which is fed from a plurality of radial points of entry into said cavity spaced equidistance from each other around the circumference of said cavity and the flow distances from said manifold to each of said points of entry are substantially equal, whereby substantially equal pressure is achieved around the die circumference.

References Cited

UNITED STATES PATENTS 3,118,800  1/1964  Snelling _____ 156—500 X
3,128,216  4/1964  Reed _____ 156—432 X RALPH S. KENDALL, Primary Examiner U.S. Cl. X.R.

156—432, 188, 443, 190, 500, 195; 425—113; 264—166, 173; 138—129, 137